No. 660,436. Patented Oct. 23, 1900.
J. H. HIND.
BULKHEAD AND DOOR.
(Application filed July 2, 1900.)
(No Model.) 8 Sheets—Sheet 1.
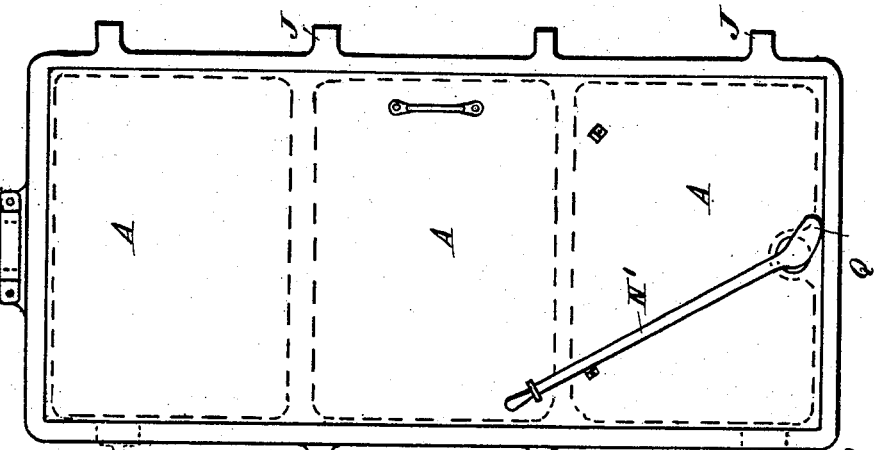
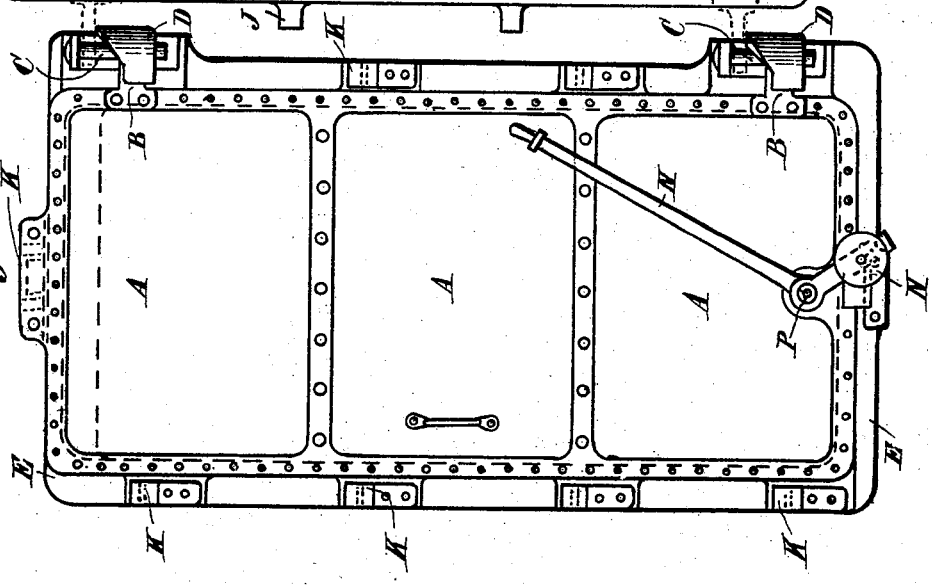
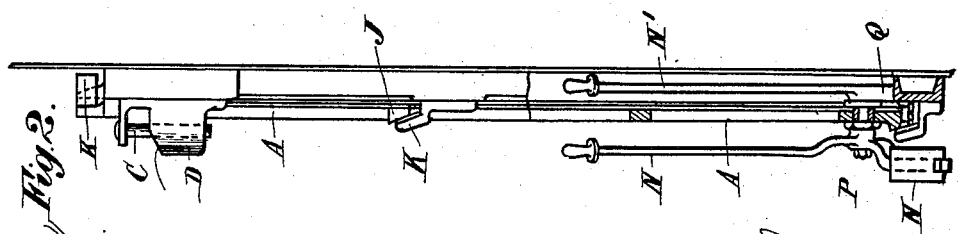

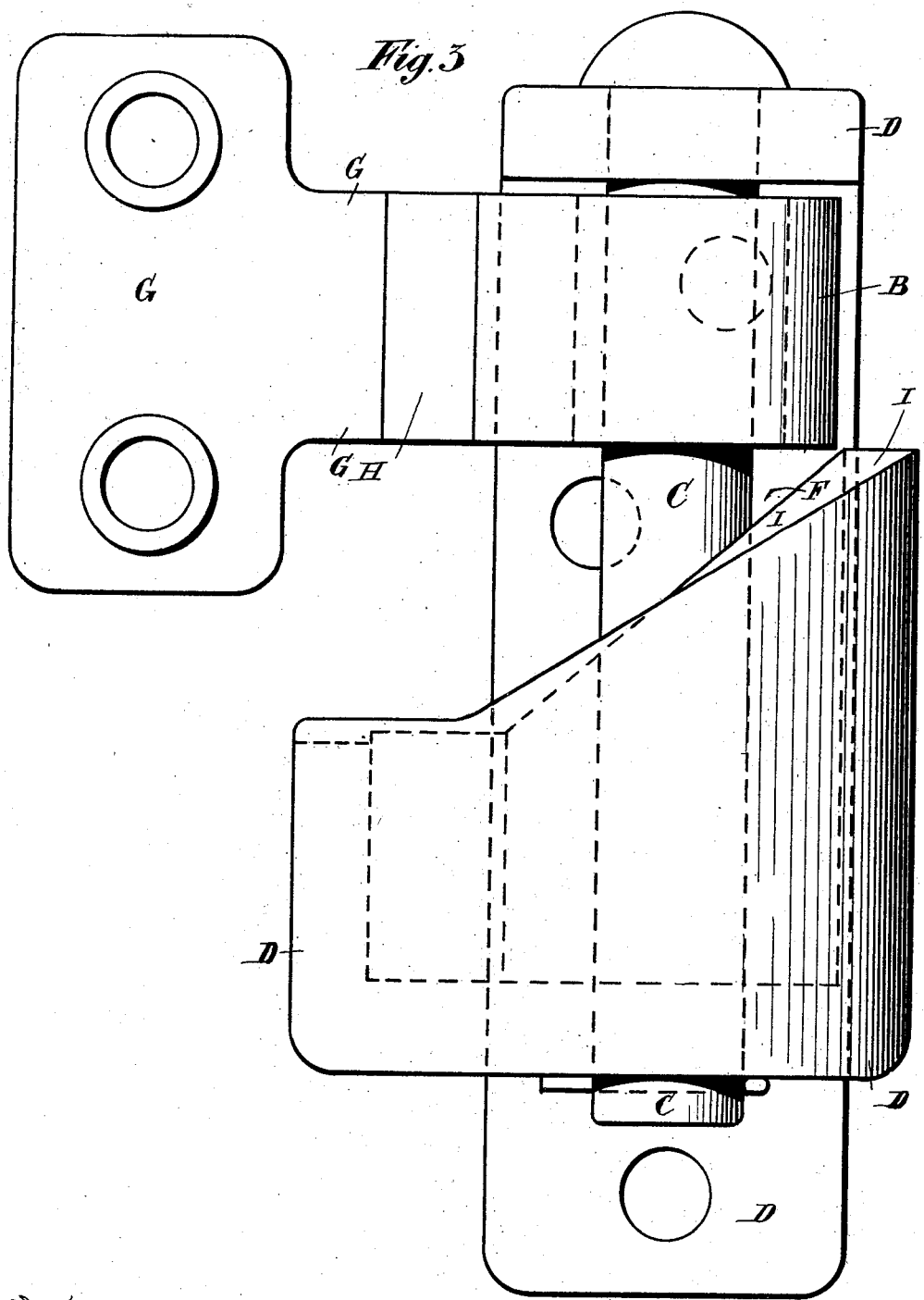

No. 660,436.
J. H. HIND.
BULKHEAD AND DOOR.
(Application filed July 2, 1900.)
Patented Oct. 23, 1900.
(No Model.)
8 Sheets—Sheet 3.
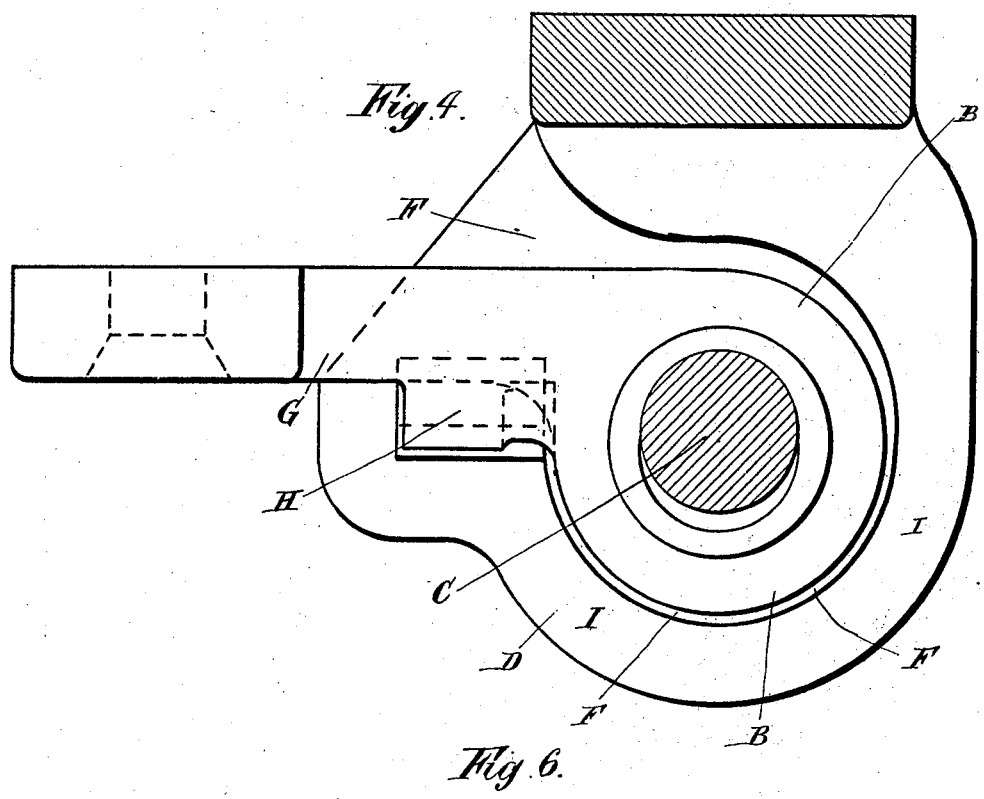
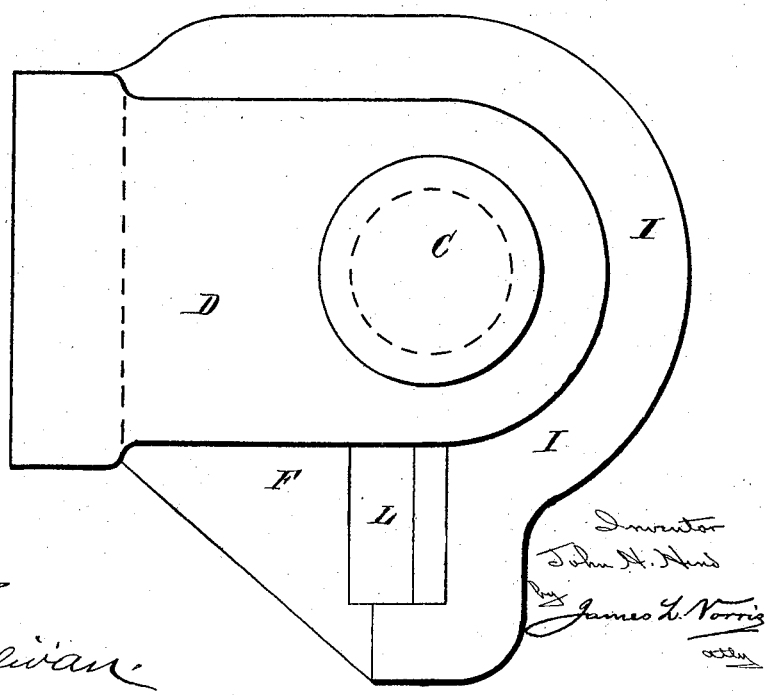

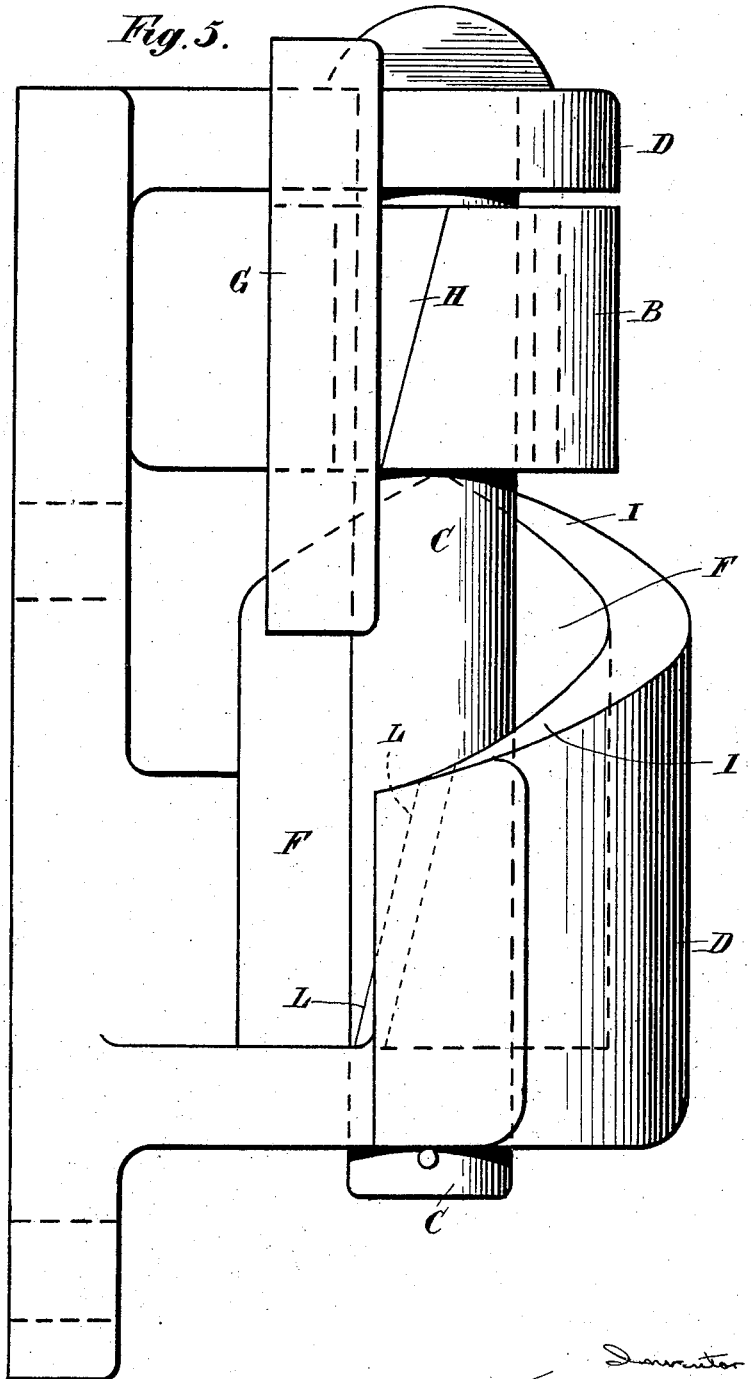

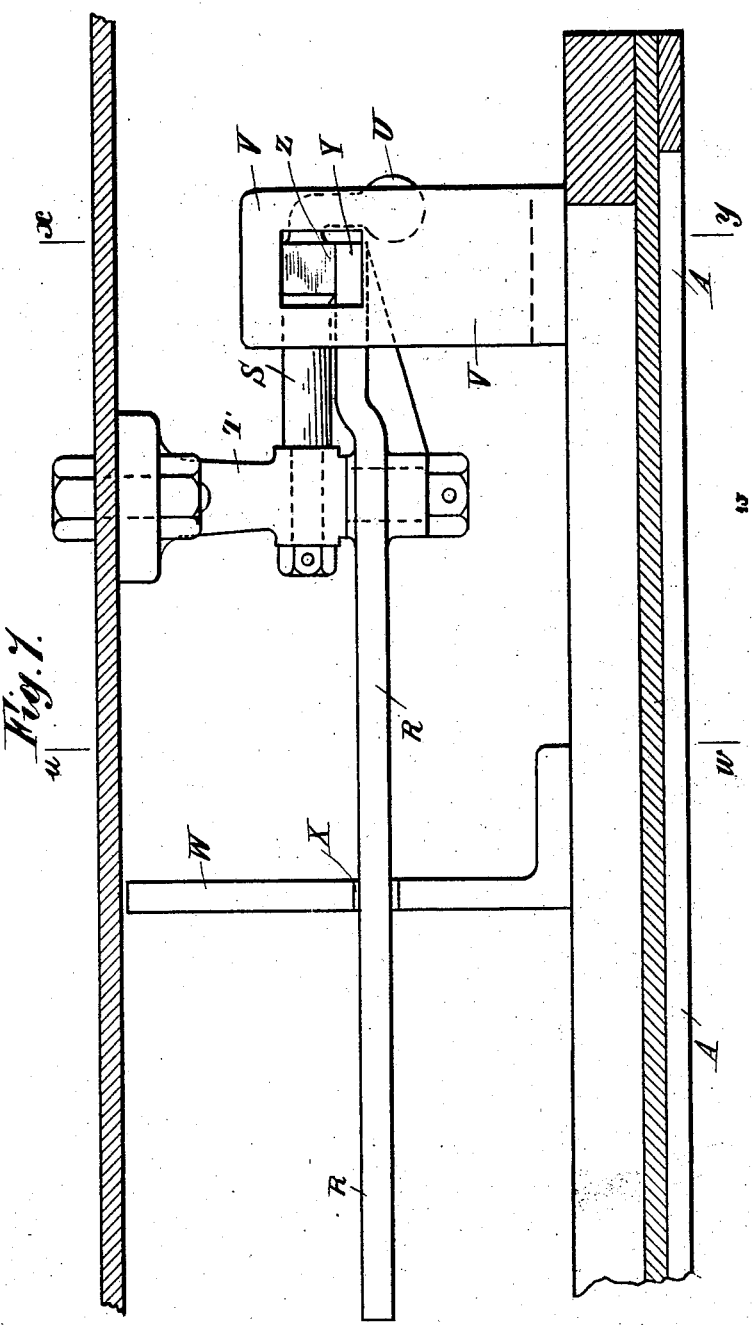

No. 660,436. Patented Oct. 23, 1900.
J. H. HIND.
BULKHEAD AND DOOR.
(Application filed July 2, 1900.)
(No Model.) 8 Sheets—Sheet 6.
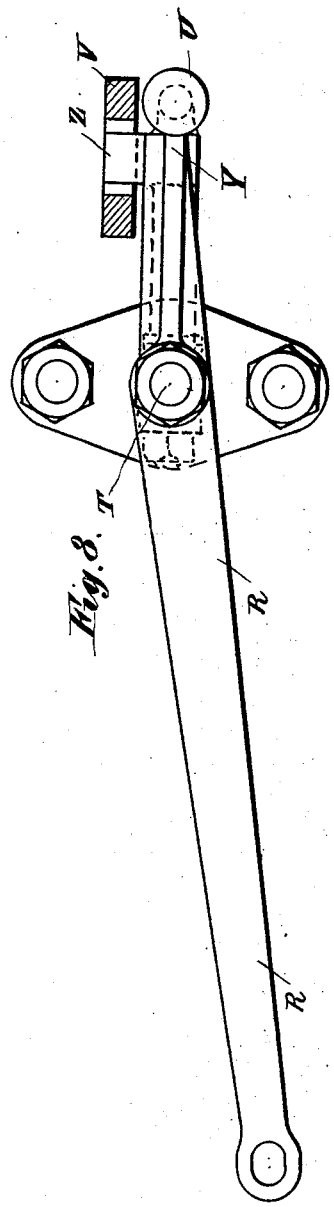
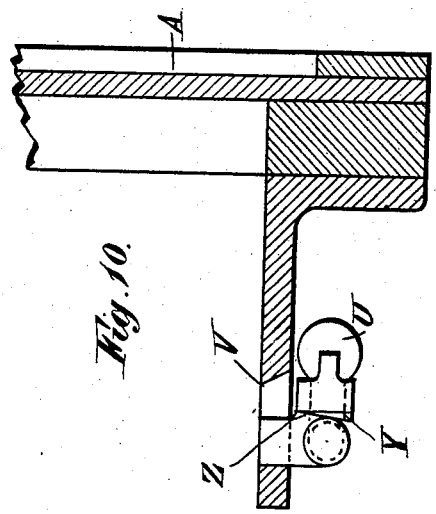
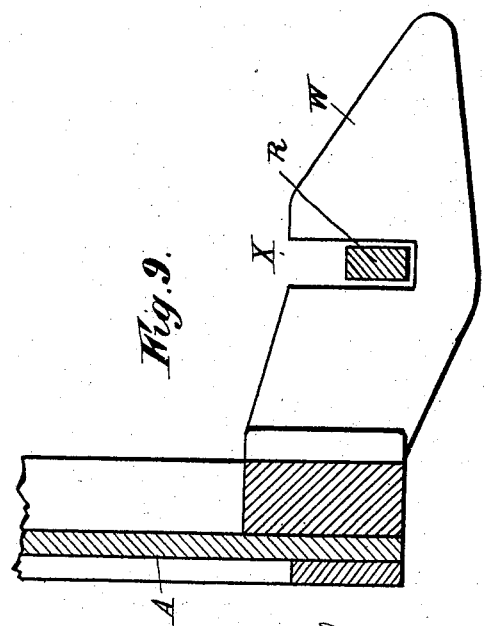

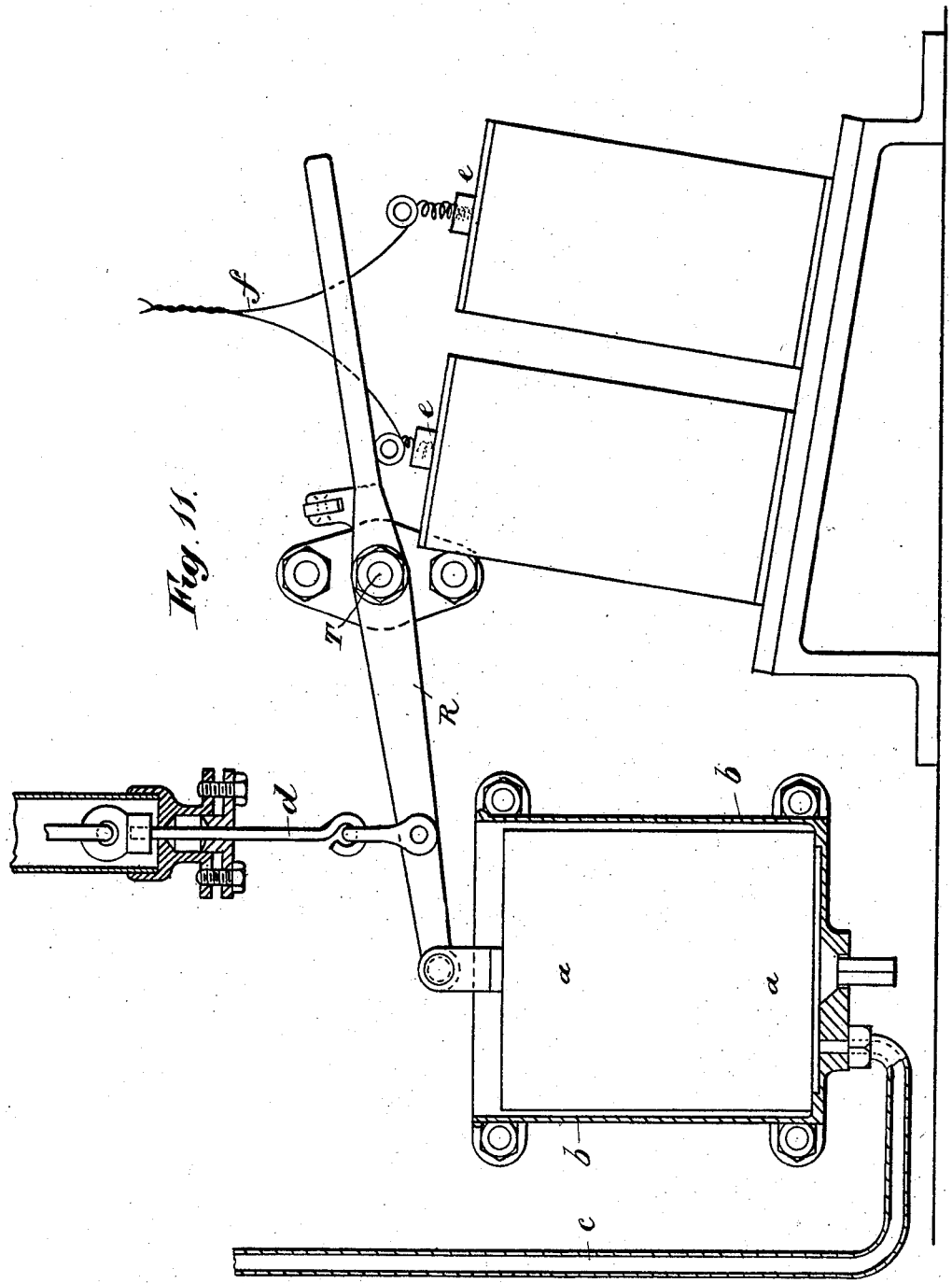

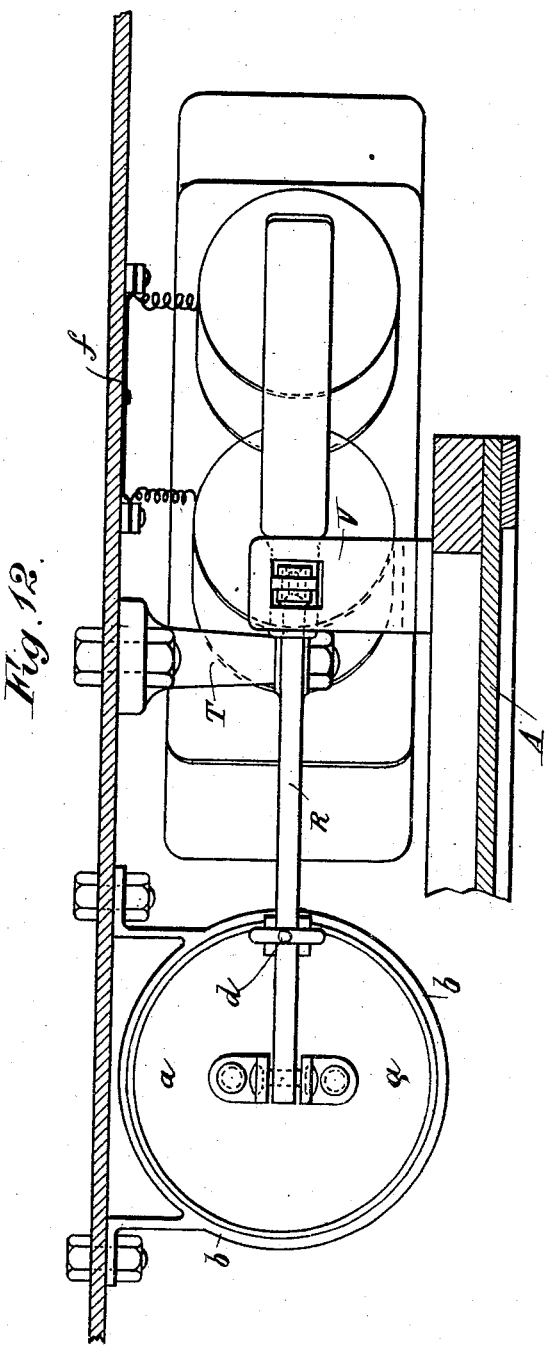

UNITED STATES PATENT OFFICE.

JOHN HOLSALL HIND, OF BARROW-IN-FURNESS, ENGLAND.

BULKHEAD AND DOOR.

SPECIFICATION forming part of Letters Patent No. 660,436, dated October 23, 1900.

Application filed July 2, 1900. Serial No. 22,326. (No model.)

*To all whom it may concern:*

Be it known that I, JOHN HOLSALL HIND, a subject of the Queen of Great Britain, residing at Stanley road, Barrow-in-Furness, Lancaster county, England, have invented certain new and useful Improvements in Tight-Fitting Doors of Ships' Bulkheads, Strong Rooms, Buildings, Safes, and the Like, of which the following is a specification.

This invention relates to means or appliances connected with drop-closing doors of ships' bulkheads, strong rooms, safes, for separating parts of buildings against the ravages of fire, flooding, and other emergencies for which such water and fire proof doors are capable of employment.

The invention is in connection with a water-tight and fireproof door in which the door must be lifted in its frame before it can be opened on its hinges, and for this purpose I employ a lifting-lever attached to the door and acting upon the frame as a fulcrum, the same lever serving by a swing-forward action for opening purposes to throw the weight of the door upon inclined top surfaces of the hinge-gudgeons, and thus by a continued swing action the door rides up the inclines until it is fully open, at which position it can be held by a lever-bolt engaging an eye on the door within its range. This lever-bolt may be released from either side of the bulkhead or structure by several methods, hereinafter described, to free the door and enable it to close by sliding down the inclined top faces of the hinge-gudgeons, and finally for the hinge-plates to drop into the notches or slots of the gudgeons and by such slots, in conjunction with wedge-clips, be forced home water-tight against the face of the bulkhead or framing.

My invention is illustrated in the annexed drawings, in which—

Figure 1 is an elevation of the door when closed and its framing, and Fig. 1ª an elevation of the door in its open position. Fig. 2 is an end view, partly in section. Fig. 3 is a front elevation of my special hinge; Fig. 4, a plan of same with the top plate removed. Fig. 5 is a side elevation of the hinge, and Fig. 6 a plan of a hinge-gudgeon. Fig. 7 is a plan of door-releasing-lever catch, and Fig. 8 an elevation of same, Figs. 9 and 10 being sections on the lines $u$ $w$ and $x$ $y$, respectively, of Fig. 7. Fig. 11 is an elevation, and Fig. 12 a plan, of releasing-gear for the lever-catch.

Referring to Figs. 1, 1ª, and 2, A is the door, fitted with hinge-eyes B for pivoting on hinge-pins C, fixed in special hinge-gudgeons D on the bulkhead or other framing E of the door. These hinge-gudgeons have each a slot-notch F, Figs. 4 and 5, in which the arm or plate G of the hinge-eye B rests when the door is down and closed. The tapered bearing portion H of said arm G acts as a wedge with others on the door to firmly fix the door to the bulkhead or framing E, the arm G when the door is raised and swung forward riding upon the incline I of the gudgeon, thus raising the door still farther until it comes into contact and is held by the lever-catch, hereinafter referred to.

The door has also two or more wedge-pieces J J on each side, which take into tapered clips K K when the door drops, and these, in conjunction with the tapered bearings H of the hinge-arms G, also the tapered edge L of the gudgeon, cause the door when dropping to be forced by its own weight into close water-tight contact with the framing E.

N is a counterweighted cam-lever fitted at the lower part of the door, its fulcrum-pin P passing through the door for a corresponding lever N' to be operated on the other side, the cam Q bearing upon the framework when operated for raising the door out of the hinge-slots F and the tapered clips K to enable the door to be swung around and open.

Referring to Figs. 7, 8, 9, and 10, illustrating the door-releasing-lever catch, R is a lever pivoted to the bulkhead or other fixed piece, and S is a cranked tumbler-catch pivoted on the arm T and weighted at U, its tendency being to drop out of engagement with the angle-lug V on the door.

W is an inclined arm connected to the door (see Fig. 9) and upon which rides the lever R when the door is swung open until it drops into the slot X. The short end of said lever then rises and by its wedge face Y engaging with the corresponding face Z of the cranked catch S forces the latter up into the slot of the angle-lug V on the door, as seen in Fig. 10, and so holding it in an open position. It will be seen that by lifting the long end of the lever out of the slot X the short end will be depressed and allow the weighted catch to fall, thus freeing the door, which then by reason of the sharp inclined top faces of the hinge-gudgeons begins to travel back by gravity and of its own accord until the hinge-arms G reach the wedge termination L, when they drop heavily into the slots and the door is forced home tightly by the wedges J and tapered clips K aforesaid.

The releasing-lever R may be lifted by hand directly or by the releasing-gear illustrated in Figs. 11 and 12. In these views, $a$ is a buoyant body fitting loosely in a tank $b$, capable of being filled or of filling with water automatically in cases of accident, such as to a vessel to the bulkhead of which such a door may be employed, the bouyant body $a$ being connected with the releasing-lever R previously referred to $c$ is a pipe for flooding the float-chamber from any given place.

$d$ is a link connection for operation by a wire pennant running to the upper deck of a vessel or to any given part in a building or other place.

$e$ is an electromagnet, which is energized by a current being passed through the conducting-wire $f$ and so attracting the short end of the releasing-lever R.

Such a door fitted to a safe or a strong-room could have any secure kind of lock fitted to fix the lift-lever as well as the ordinary locks, the door not being available for opening, as with the present make of safe or strong-room doors, until raised in the manner described. For ease of motion and to provide for wear and tear of the frictional surfaces these may be fitted with suitable brasses, which may be renewable, if desired.

What I claim, and desire to secure by Letters Patent, is—

1. In a door for bulkheads, strong rooms and the like, the combination with the door provided with a pair of hinged eyes, hinge-gudgeons secured to the bulkhead or door-frame, pins C fixed in said gudgeons and adapted to be mounted in said eyes for hinging the door thereto, an arm connected to said hinged eyes and resting within said gudgeons when the door is closed and riding upon the same when the door is opened, a series of wedge-pieces connected to the door, a series of clips secured to the bulkhead or frame and adapted to receive said pieces when the door is closed, means when operated adapted to release the door from the bulkhead or frame, means for automatically locking the door in an open position, and means for releasing said door to permit of the closing of the same by gravity.

2. In a door for bulkheads, strong rooms or the like, the combination with the door, of a hinged connection for obtaining a vertical and lateral movement of said door suitably secured thereto and to the bulkhead or door-frame, means connected to said door and adapted when operated to permit of said vertical and lateral movement, means carried by said door for locking the same in an opened position, and means for releasing the door to permit of the closing of the same by gravity.

3. In a door for bulkheads, strong rooms or the like, the combination with the door, of a hinged connection for obtaining a vertical and lateral movement of the door suitably connected thereto and to the bulkhead or a door-frame, a pair of levers connected to said door and adapted when operated to permit of said vertical and lateral movement, a lug carried by the door, means engaging the same and adapted to lock the door in an open position, and means for releasing said door to permit of the latter closing by gravity.

4. In a door for bulkheads, strong rooms or the like, hinge-gudgeons, hinge-arms operating therein, a tumbler-catch, a lug adapted to engage said catch, and a lever for releasing said catch from its engagement with said lug.

5. In a door for bulkheads, strong rooms and the like, hinge-gudgeons, hinge-arms operating therein, a weighted tumbler-catch, a lug, a lever adapted to bring said catch into locking engagement with said lug, and means for operating said lever for releasing said catch from its engagement with said lug.

6. In a door for bulkheads, strong rooms and the like, hinge-gudgeons, hinge-arms operating therein, a tumbler-catch, a lug, a lever adapted to bring said catch into locking engagement with said lug, an arm engaging said lever, and means connected to said lever for operating the same causing the release of said catch.

7. The combination with a bulkhead or door-frame, of a door, a series of wedge-pieces carried thereby and adapted to be seated in clips carried by the bulkhead or door-frame, hinge-gudgeons connected to the bulkhead or door-frame, means connected to said gudgeons and said door to permit of a vertical and lateral movement of the latter, a pair of levers suitably connected to said door and adapted when operated to permit of said vertical and lateral movement, a tumbler-catch, a lug carried by said door and adapted to engage said catch for retaining the door in an open position, automatic means for operating said catch, and means for releasing said catch.

In testimony whereof I have hereunto set my hand in presence of two subscribing witnesses.

JOHN HOLSALL HIND.

Witnesses:
W. H. ATKINSON,
HAROLD G. JAMES.